Figure 1:
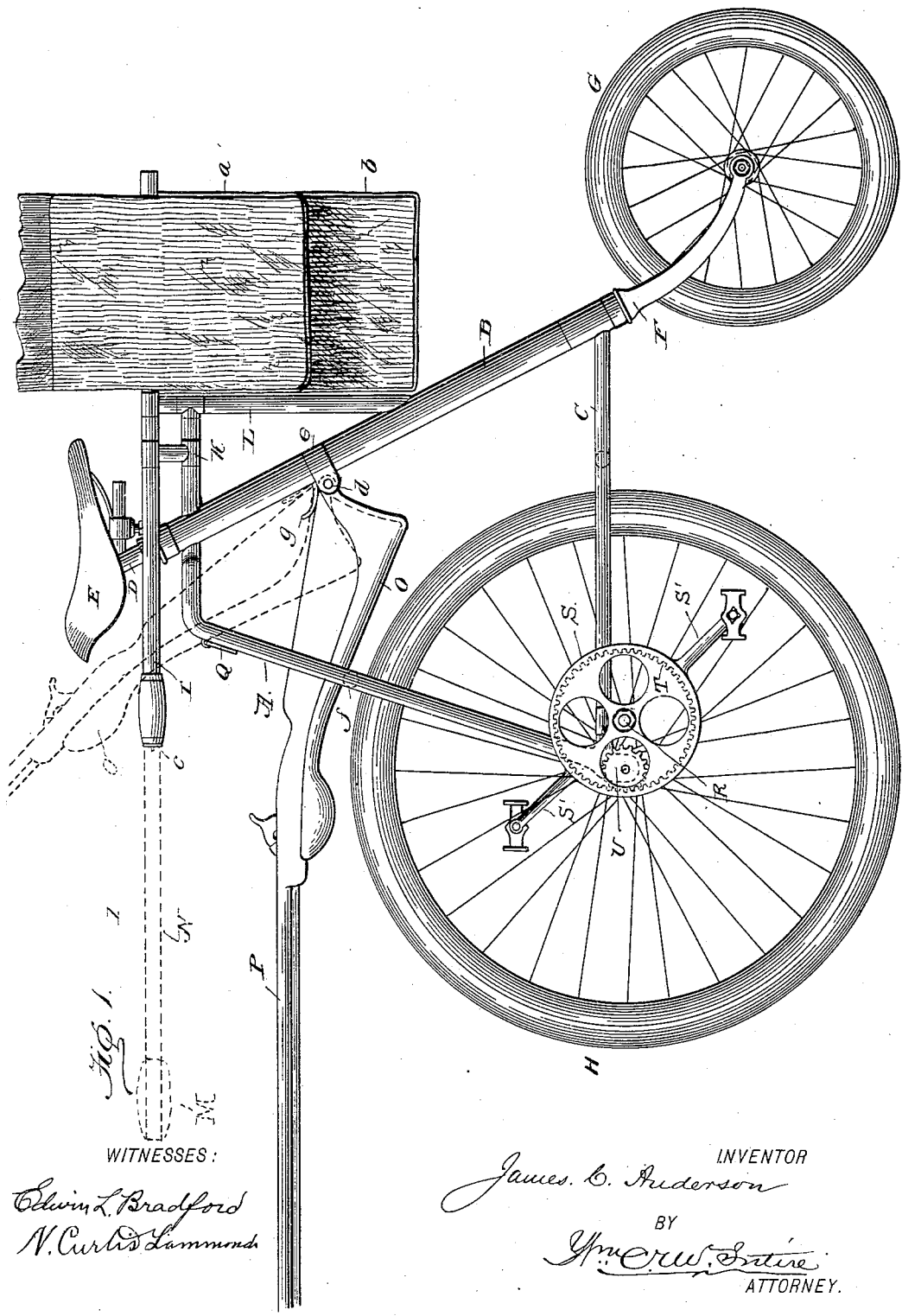

No. 633,745. Patented Sept. 26, 1899.
J. C. ANDERSON.
MILITARY BICYCLE.
(Application filed May 17, 1898. Renewed Mar 2, 1899.)
(No Model.) 2 Sheets—Sheet 1.

WITNESSES:
Edwin L. Bradford
N. Curtis Lammonds

INVENTOR
James C. Anderson
BY
Wm C. W. Entire
ATTORNEY.

THE NORRIS PETERS CO., PHOTO-LITHO., WASHINGTON, D. C.

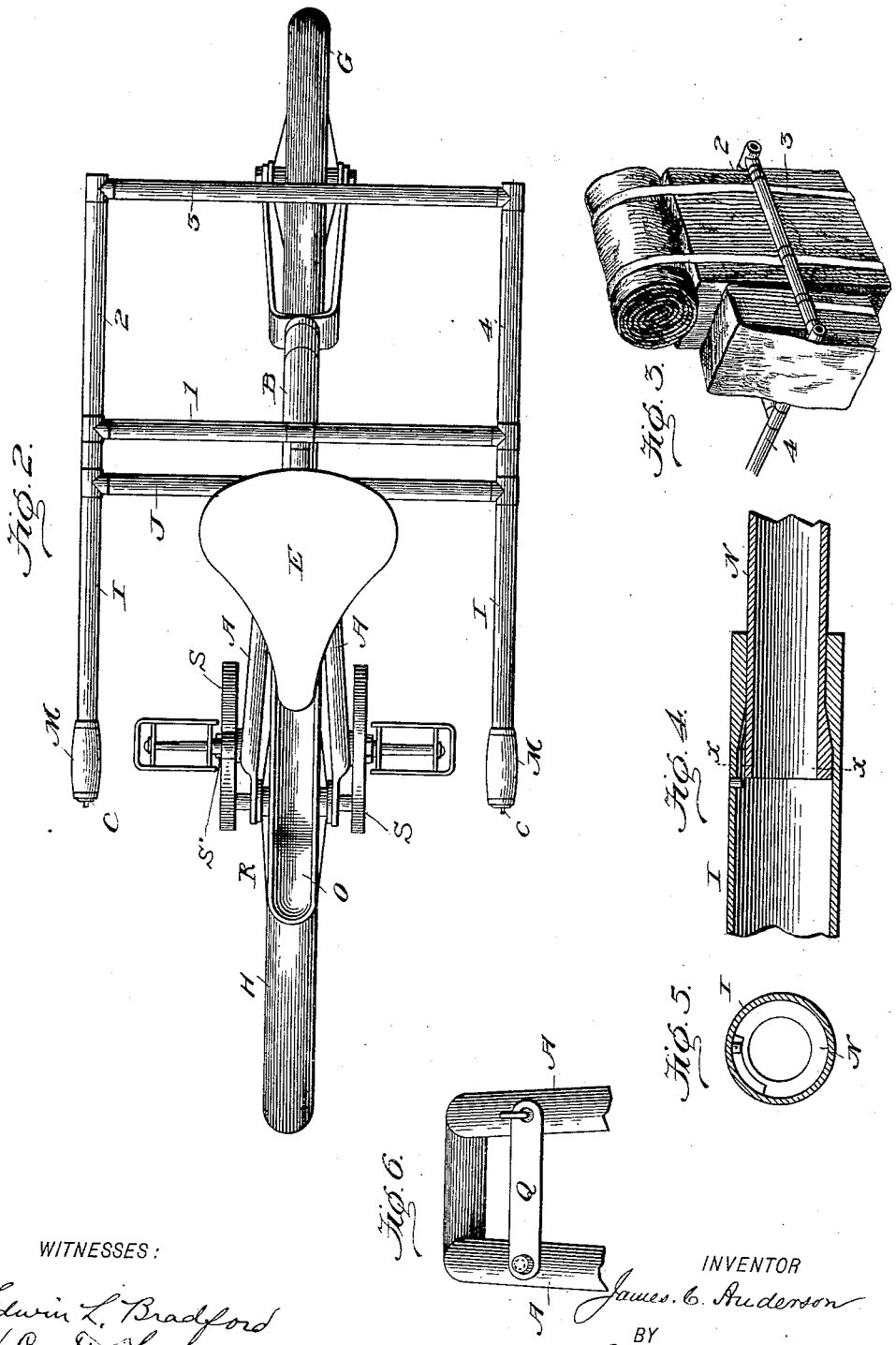

UNITED STATES PATENT OFFICE.

JAMES C. ANDERSON, OF HIGHLAND PARK, ILLINOIS.

MILITARY BICYCLE.

SPECIFICATION forming part of Letters Patent No. 633,745, dated September 26, 1899.

Application filed May 17, 1898. Renewed March 2, 1899. Serial No. 707,543. (No model.)

*To all whom it may concern:*

Be it known that I, JAMES C. ANDERSON, a citizen of the United States, residing at Highland Park, in the county of Lake and State of Illinois, have invented certain new and useful Improvements in Military Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain new and useful improvements in bicycle construction, and particularly to that class shown and described in an application for Letters Patent filed by me May 5, 1898, Serial No. 679,756, covering a construction particularly adapted for use in military service. In the application referred to I have shown and described an A-shaped machine with the steering-wheel forward of the rider and controlled by the rotation of the saddle-post. It also shows and describes the gun carried in a fixed support secured to the front tube of the frame.

My present invention has for its object to provide a bicycle suitable for use in the military service and with the small steering-wheel arranged at the rear of the machine and the larger driving-wheel in front, whereby I am enabled to very considerably shorten up the frame and make the machine compact. The result of this shortening of the frame not only makes the machine more compact, as stated, but it also overcomes the inherent defect in long-coupled machines having a rear steering-wheel, because in the latter class of machines it is obvious that the long distance between the wheels renders the front or driving wheel slow or sluggish in responding to the influence of the rear steering-wheel. In other words, the longer the distance between the axes of the front and rear wheels the slower will be the change made in the course or direction of the front wheel, and the converse is also true. Another disadvantage in a long-coupled machine lies in the fact that the farther away from the front wheel the steering-wheel is located the greater will be the disturbance in the equilibrium of the rider and the more difficult it is for him to retain his seat.

In a machine for personal locomotion, propelled wholly by the human body, whether used for transportation of the rider only or for the additional service of a carrier, especially for carrying the necessary equipments of a soldier, it is not only desirable that the machine should be compact and small as possible, but it should, as it were, fit the rider mounted thereon in an upright soldierly position, which position is manifestly best suited to the human anatomy and best conserves the human force of the body in propelling the machine, as well as in maintaining the proper equilibrium. In other words, the articulation of the body of the rider and of the machine should compensate each other, and in such a wheel it is also desirable that the rider should be able to mount in front, and when occasion requires to dismount forwardly or in the direction of the motion of the wheel, and hence it is important that his movements should not be obstructed by the usual arrangement of handle-bars in front of him.

In the present type of safety-bicycles, which involves the use of smaller wheels than were employed in the older type and geared up to a suitable peripheral speed, with the pedal-shaft mounted between the front and rear wheels, it has been necessary to place the front steering-wheel well forward to enable it to swing clear of the toes of the rider, who must bend his body forward out of the proper position to fit the machine. Hence the machine is out of all due proportion on its base-line and otherwise.

My invention consists in the construction and arrangement of the parts of a bicycle, whereby the steering-wheel becomes operative practically when mounted in the rear of the driving-wheel and so that the rider may exert his force to the best advantage through the medium of the crank and suitable intermediate mechanism to the front or driving wheel, as will be hereinafter more fully explained.

My invention consists, further, in the details of construction and combination of devices hereinafter more fully set forth and claimed.

In order that those skilled in the art to which my invention appertains may fully understand the same, I will proceed to describe the construction and arrangement of parts, referring by letters to the accompanying drawings, in which—

Figure 1 is a side elevation of a bicycle embodying my improvements with a gun shown supported in a horizontal position and shown in dotted lines as held in a vertical position, also showing knapsack, &c., in position. Fig. 2 is a top or plan view of the same with the gun and knapsack removed. Fig. 3 is a perspective view of the rear portion of the frame with the knapsack, haversack, and blanket in position. Fig. 4 is a detailed enlarged longitudinal section of the handle-bar, showing a section adapted to telescope within the handle-bar. Fig. 5 is a cross-section on line $xx$ of Fig. 4; and Fig. 6 is a front view of the upper portion of the front fork of the frame with a pivoted plate or strap for holding the gun in an elevated position, as shown in dotted lines at Fig. 1.

Similar letters and figures of reference denote like parts in the several views.

A represents the front fork of the frame, B the rear tube of the frame, and C the lower fork or brace.

D is the saddle-post; E, the saddle; F, the steering-fork; G, the steering-wheel, and H the front driving-wheel.

By reference to Fig. 1 of the drawings it will be seen that the rear steering-fork is arranged at an acute angle to the base-line and that the saddle is arranged directly over said fork. In other words, the saddle occupies such a position that the upward prolongation of the steering-fork would intersect the former and that the gravity-line of any load upon the saddle would intersect the upper end of the rear fork at an acute angle, and consequently when the rear steering-wheel G is turned to the right or left in driving the machine said wheel will assume a pitch or lateral inclination which will cause it to traverse a curved path of different radius to that which will be traversed by the forward driving-wheel H, and the said curved path described by the steering-wheel will by reason of the pitch or inclination be a compromise or in a plane between the curved paths respectively described by the steering-wheel and driving-wheel if the former were arranged at a right angle or an obtuse angle. Again, by reference to Fig. 1 it will be seen that the saddle and its load are directly over the top of the steering-stem adjacent to and in rear of a vertical line through the axis of the front wheel, and hence the centrifugal, centripetal, and mass forces are all brought into proper equilibrium, or differently stated the arcs respectively described by the two wheels converge or theoretically start from the pivotal point of the steering-wheel G, and consequently the load on the saddle is always in the plane of equilibrium between the paths of travel of the two wheels. Hence the tendency which would occur in all previously-suggested types of rear steering-wheels of throwing the rider laterally is avoided.

The front fork A is bent rearward and joined to the rear tube B.

The handle-bars I are rigidly secured within T-heads to a horizontal cross-tube J, which in turn is permanently secured by a short vertical tube to a brace K, joined at its front end to the rear tube B of the bicycle-frame and at its rear end to a vertical tube L, which forms a brace between the frame-tube B and an auxiliary baggage-frame 1 2 3 4.

A rectangular frame composed of tubes 1 2 3 4 is secured to the rear ends of the handle-bars I I and constitutes a support for the knapsack, haversack, blanket, &c., as clearly shown at Figs. 1 and 3, which are held in position by suitable straps $a\,b$, as seen at Fig. 1.

The hand-grips M M are secured to the front ends of telescoping sections N, which are housed within the handle-bars I and which may extend rearwardly into the tubes 2 and 4 of the baggage-frame.

The front ends of the sections N are provided with rings or hooks $c$, adapted to interlock with rings or hooks on the sides of the cartridge-belt of the rider, so that as he dismounts in a forward direction the sections N will be drawn out and constitute shafts, by which the bicycle is trailed behind, all as fully described in my pending application hereinbefore referred to.

O is a gun-support adapted to fit the stock of the gun P, as clearly shown at Fig. 1, and at the same time serve as a mud-guard. The rear end of the support O is pivoted at $d$ to a clip $e$, secured to the rear tube B, and is held in a horizontal position upon bridge or pin $f$ across the front fork A, as shown in dotted lines at Fig. 1. $g$ is a flat spring secured by the pivot $d$ in such a manner that it will hold the gun securely in place when in horizontal position or yield when the gun is swung up into the position shown by dotted lines, in which position the gun is held by the pivoted plate or strap Q'. (See Fig. 6.)

Any suitable mechanism may be employed for driving the front wheel H; but I have shown one in which R represents a stud fixed to the frame and carrying the driving-gear S and pedal-cranks S', the cogs T of this gear S being formed internally to mesh with the pinion U, fixed to the driving-wheel. The gear S is mounted in suitable ball-bearings upon the stud R, fixed, as before stated, to the frame of the machine in the rear of the pinion of the driving-wheel and in such relation thereto that the internal gear will span over the pinion forwardly, so that the driving-shaft of the gear shall have a central axis in the rear of the pinion in a plane substantially horizontal or in a line with the driving-wheel center. This location of the pedal-shaft and the internal gear with reference to the axis of the driving-wheel and the pinion thereon is essential to compensate for the near approach of the gravity-line of the rider to the axis of the front wheel (due to the shortening up of the frame) and to prevent "headers," which would otherwise occur.

I do not wish to be limited to the exact form shown by the gun-support or to the particular way in which it is connected with the rear tube of the frame, so long as it is capable of supporting the gun in the two positions shown.

It will be seen from the construction and arrangement of the frame and the location of the steering-wheel at the rear that I am enabled to make the frame very compact and short, and thus materially lessen the weight of the same, and that a very limited movement of the saddle-post will change the direction of travel of the machine, all of which is very essential in a military bicycle which serves as a conveyance for a soldier and his baggage on good roads and over bad roads constitutes a ready and light conveyance for the baggage alone.

It will be understood that I do not wish to confine myself to the specific means shown for operating the steering-wheel through the medium of the saddle, as said steering-wheel may be operated equally as well through the medium of the handle-bars.

What I claim as new, and desire to secure by Letters Patent, is—

1. A military bicycle embodying in its organization a short triangular frame A, B, C, a front driving-wheel H, a rear steering-wheel G, an auxiliary baggage-frame 1, 2, 3, 4, a pivoted gun-support O, and means for holding the gun-support in a horizontal or a vertical position as and for the purpose hereinbefore set forth.

2. In combination with the frame A, B, C, a gun-support O, pivoted to the tube B of the frame, and a spring $g$ for holding the gun P within the support O, as hereinbefore set forth.

3. In combination with the frame A, B, C, and pivoted gun-support O, the bridge-pin $f$, and gate or strap Q, substantially as and for the purposes set forth.

4. A bicycle embodying in its organization, a short, triangular or A-shaped frame, A, B, C, a front driving-wheel, a rear steering-wheel, means for steering the wheel located in a plane at an acute angle to the base-line, and a saddle arranged over the upper end of the wheel-steering device, to the rear of and adjacent to a vertical line through the axis of the front wheel, substantially as and for the purposes set forth.

5. A bicycle embodying in its organization, a short, triangular frame A, B, C, a front driving-wheel, journaled in said frame, a rear steering-wheel, a saddle located to the rear of and adjacent to a vertical line through the axis of the front wheel, an internal driving-gear having a central axis in the rear of the axis of the driving-wheel and in substantially the same horizontal plane therewith, and a pinion fixed to the axis of the driving-wheel and meshing with the internal driving-gear, substantially as and for the purposes set forth.

In testimony whereof I affix my signature in presence of two witnesses.

JAMES C. ANDERSON.

Witnesses:
N. CURTIS LAMMOND,
D. G. STUART.